July 15, 1969

J. H. FOX 3,456,095

SOLID STATE TEMPERATURE CONTROL CIRCUIT WITH ANTICIPATION
AND COMPENSATION FEATURES

Filed Oct. 6, 1965

INVENTOR:

James H. Fox

BY George R. Clark

ATTORNEY

July 15, 1969  J. H. FOX  3,456,095
SOLID STATE TEMPERATURE CONTROL CIRCUIT WITH ANTICIPATION
AND COMPENSATION FEATURES
Filed Oct. 6, 1965  2 Sheets-Sheet 2

INVENTOR:
James H. Fox

BY George R. Clark

ATTORNEY

United States Patent Office 3,456,095
Patented July 15, 1969

3,456,095
SOLID STATE TEMPERATURE CONTROL CIRCUIT WITH ANTICIPATION AND COMPENSATION FEATURES
James H. Fox, Sterling, Ill., assignor to Sunbeam Corporation, Chicago, Ill., a corporation of Illinois
Filed Oct. 6, 1965, Ser. No. 493,425
Int. Cl. H05b 1/02
U.S. Cl. 219—501                                    10 Claims

ABSTRACT OF THE DISCLOSURE

A solid state temperature control circuit for controlling the application of discrete half-waves of power to the heating element of a device by utilizing an SCR in combination with temperature sensitive resistance, unidirectional conducting diodes and conventional resistors and capacitors.

---

This invention pertains to solid state circuits for sensing and controlling the temperature of electrically-head appliances; more particularly, it pertains to a very simple arrangement by which a single solid state switch, such as a silicon controlled rectifier, can accurately control the application of heating current to such an appliance from an AC supply, to maintain the operating temperature at a precisely selectable level within a very close tolerance range. The system of the invention differs basically from known phase-angle-of-firing control circuits in that when heating current is called for by the decision circuitry, full half cycles of the AC wave are applied to the heater, the control being exercised in terms of the frequency of application of such half-cycles of current. The decision as to whether or not current will be supplied during a given half-cycle interval of the AC wave is made so rapidly that the system is also basically distinguished from prior "on-off" types of control.

The automatic regulation of temperature in electrically heated appliances, instruments and the like has been accomplished in a variety of ways. For small appliances such as electric pressing irons, cooking utensils and the like, bimetallic thermostatic switches have been widely used. It has also, of course, been proposed to replace these relatively insensitive and short-life devices, with their characteristic rapid contact deterioration, by electronic controls; most recently, by means of solid state switching devices such as silicon controlled rectifiers or silicon controlled switches. While in theory purely solid state circuitry would appear to offer manifold advantages, both size and cost considerations have made it impractical to employ other than very simple and comparatively primitive circuitry. Such simple circuits have proved wholly inadequate to the task, for one reason or another.

It is accordingly a principal object of the present invention to provide a quickly-responding heating control circuit utilizing only a single solid state switch device, specifically an SCR (silicon controlled rectifier) device in combination with temperature-sensitive resistances (thermisters), simple unidirectionally-conducting diodes, conventional resistors and a capacitor; all so connected and arranged as to be capable of close regulation, to any selected value of temperature within a range, by control of the application of discrete half-waves of power to the heating element of the device.

It is emphasized that while the arrangements according to the invention operate in an "on-off" fashion insofar as a single AC cycle is concerned, the effect is that obtained with true proportional control but without the complications introduced by known firing-angle control systems.

A further object of the invention is to provide control circuits of the above kind in which a thermistor that is used as the temperature-sensing element of the circuit is also subjected selectively to the passage of a current derived from the switched circuit of the heater element, for the selective production of a self-heating effect within the thermistor (cumulative to the heating thereof due to its proximity to the heating element or an appliance portion heated thereby); to the end that the tendency of the actual or final temperature to overshoot or "undershoot" the desired value may be overcome by the resulting anticipatory action of the thermistor.

Still another object of the invention is to provide, in a circuit of the kind just described, compensation for the fact that the firing current levels of commercial silicon controlled rectifiers depend in a significant way upon the temperature condition at the gate junction contact. In view of the fact that the circuit as already described operates to switch the power on for a varying number of full half cycles, in response to the thermistor signal, accurate power control depends upon the firing threshold level of the controlled rectifier, which in turn depends upon the ambient temperature condition as well as upon the heating effect, within the controlled rectifier, of any power flowing through it. The invention provides compensation for both of these heating effects upon the controlled rectifier, by means of an additional thermistor that is mounted in heat-exchange (and therefore temperature-sensing) relation to the controlled rectifier unit itself.

In essence, the above and other objects of the invention are accomplished by connecting the silicon controlled rectifier in series with the main heating resistor of the appliance and an A-C supply line, so that the anode-cathode path conduction of the rectifier turns the heater current on and off in response to the current supplied to its gate electrode. A shunt circuit which is directly across the A-C supply line includes in series a phase-shifting capacitor, an adjustable level-setting resistance, and a first thermistor having a negative temperature-coefficient of resistivity. At an intermediate point on this shunt circuit, a conductor taps off current which is supplied through a protective diode to the gate electrode of the controlled rectifier, the diode being poled so as to protect the gate junction against the flow of inverse current which could damage the junction. Variation in the setting of the adjustable resistance of the shunt circuit determines whether the gate electrode current becomes sufficiently grea, at the start of any positive-going half cycle, to fire the controlled rectifier, and thus supply current to the main heater for the succeeding half-cycle of A-C input. The resistive elements of the shunt circuit are in turn shunted by both a conventional diode, to prevent power dissipation in these components during the following half-cycle of the supply (during which power is not supplied to the heater), and by a coarse or range-setting resistor which establishes the available range of firing current amplitude within which the adjustable resistance effects its precise control selection.

This range-setting resistor also lowers the collective impedance of the resistors which it shunts, to maintain the large (substantially 90 degree) phase angle of leading voltage which is required for the controlled rectifier to fire early in each positive half-cycle for which the decision circuitry calls for current to be supplied to the heater. A resistor connected from the tapping point on the shunt circuit to the conductor leading from the controlled rectifier cathode to the main heater provides the anticipation effect mentioned above, and the second thermistor, in heat-transfer relation to the controlled rectifier, is connected from the controlled rectifier gate terminal to its cathode; i.e., between the cathode terminal thereof and the main heater. Minor circuit variations by which the foregoing principles of the invention can also be implemented are described below, and such variations are intended to be represented by the foregoing illustrative example.

In an appliance, such as a pressing iron, waffle iron, or the like, all components are of course more or less in some heat-transfer relation to one another. Hence, is speaking of a thermistor as in heat transfer relation to the main heater, or to the controlled rectifier, or to the sole plate of a pressing iron (for example), what is meant is that the heat transfer condition is a substantially more direct one than in the sense of merely being within the general environment. The first thermistor, thus, will ordinarily have a portion contacting directly, or through a metallic or other path having little impedance to the flow of heat, the main heater or a directly adjacent soleplate portion. Likewise, the thermistor in heat transfer relation to the controlled rectifier will be in direct contact with (or inside) the casing of the rectifier, so as to be preferentially responsive to the temperature of the rectifier as compared to general temperature conditions in or about the appliance.

Certain preferred embodiments of the invention will now be described in considerable detail, for purposes of example and instruction, and without intending thereby to limit the invention. In the accompanying drawings, FIG. 1 is a schematic wiring diagram of a first embodiment.

Figure 1:
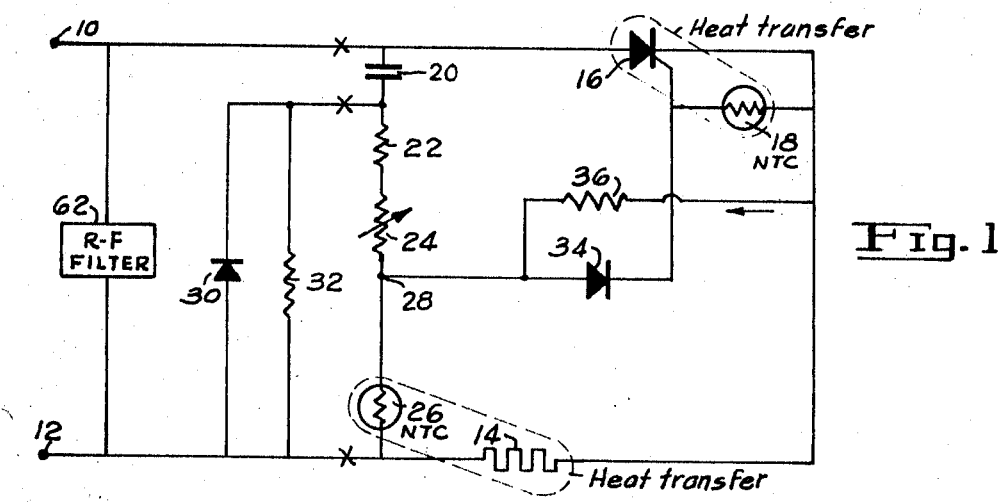

In FIG. 1, terminals 10 and 12 are the main supply terminals of the appliance, normally connected to the usual A-C supply line of 60 cycle, 115 volt power. Numeral 14 designates the main heating element or resistance, usually of several hundred watts capacity, and it is connected in series with the supply terminals 10, 12 and the anode-cathode path of the silicon controlled rectifier 16. The firing or gate electrode of the controlled rectifier is connected through a thermistor 18 (having a negative temperature coefficient) to the anode lead of the controlled rectifier, and as indicated by the dash-line oval, it is in direct heat-conducting or sensing relation to the rectifier.

A substantially 90-degree phase-shifting circuit comprising a capacitor 20, a resistor 22, a variable resistor 24, and a thermistor 26 (also having a negative temperature coefficient) is connected across the supply terminals 10, 12, so as to provide an intermediate tap point 28 a voltage of adjustable magnitude with respect to the alternating voltage wave of the A-C supply. Resistor 22 merely sets a lower limit to the value of resistance included in this shunt circuit, and thermistor 26 is, again as indicated by a dash-line oval, in direct heat-sensing relation to the heating element 14.

Since the circuit provides half-wave power to the heater 14, due to the unidirectionally-conducting nature of the anode-cathode path through the controlled rectifier 16, it is desirable to prevent the flow of current in the shunt circuit (particularly, through thermistor 26) during the negative half cycles of the supply wave. Hence, the conventional diode 30 is shunted across the resistive components of the shunt circuit, and these are also shunted by a relatively high-valued resistance 32 which establishes the general range of temperatures within which the control operations are performed.

From the intermediate point 28 a connection through a second conventional diode 34 leads to the gate electrode of the controlled rectifier 16, so as to supply it with firing current commencing at an early instant on the supply wave's positive-going half cycle, as established by the setting of resistance 24. The "anticipating" control mentioned above is represented by the resistance 36, connected from the rectifier gate terminal to its cathode terminal as shown.

Figure 2:
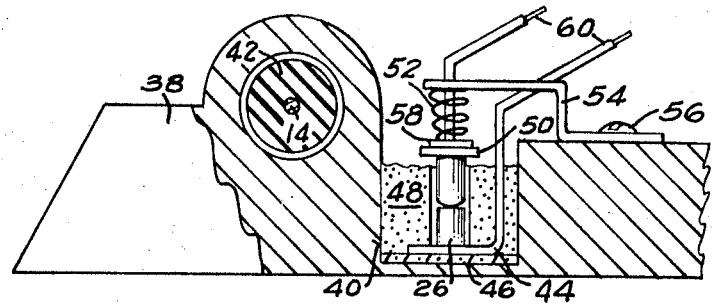
FIG. 2 is a fragmentary sectional view of the sole plate of a pressing iron or similar appliance, showing the physical relationship of essential parts of the combination.

The desired physical, or rather, thermal, relationship of the parts in a typical appliance is indicated in FIG. 2 of the drawings. Here, the main heated metallic sole plate of a pressing iron is designated by numeral 38, the same containing the usual heating element resistor 14 embedded therein and insulated electrically by the insulating metallic oxide powder 42 or the like. Near the heater element 14 and similarly embedded as in a well 40 in the sole plate is the thermistor 26 of the shunt control circuit described above, one metallic terminal 44 of the thermistor being separated from the sole plate only by a thin layer of insulation 46, as of mica which provides good electrical insulation but a substantial transfer coefficient for heat flowing from the sole plate to the thermistor. Ceramic insulation 48, or high-temperature resin such as "Glastik," or a silicone compound, surrounds the thermistor 26. The opposite terminal of the thermistor is engaged by the contact 50, urged against the thermistor 26 by a spring 52 backed against a bracket 54 secured to the adjacent sole plate body as by the screw 56. Electrical insulation between the contact 50 and the spring 52 (and other parts) is provided by an insulative washer 58 or the like. The construction shown avoids soldered connections, but can be replaced by welded contact connections or other heat-resistant means. The flexible leads that connect the thermistor in the shunt control circuit are here indicated by numeral 60.

The silicon controlled rectifier 16, and its thermally-associated thermistor 18, may be mounted at any convenient point in the appliance, as in a handle or housing, as well known to those familiar with such equipment. Preferably, the thermistor 18 is held in direct heat-transfer relation to the can of the rectifier, as by being mounted in pressure contact therewith. The other circuit components are likewise mounted in positions relatively free from the direct heating influence of the appliance heater 14. The control knob of the variable resistor 24 is, of course, positioned for ready adjustment by the user.

In selecting the main heating resistor 14, consideration must be given to the fact that it is energized only during alternate half cycles of the supply source. In a typical design, intended to dissipate a maximum heat of 1150 watts, on a 115-volt circuit, a heater resistance (cold) of 5.3 ohms was found to be satisfactory. The controlled rectifier in this application was a commercial type No. MCR 808R-4 (manufactured by Motorola, Inc.), rated at 18 amperes to allow for the relatively high-temperature environment, but other types can be substituted with suitable consideration of their properties such as case polarity, altered heat transfer due to the mounting arrangement required, critical firing current, and the like.

The values of other circuit components found appropriate are as follows: capacitor 20, 1 mfd., 117 volts A-C, Mylar insulated; variable resistor 24, 3 watts, 7,500 ohms; resistor 32, 1,200 ohms, 3 watts; resistor 36, 1,500 ohms, 5 watts; thermistor 26, 10,000 ohms at room temperature, 5 ohms at 425 degrees F.; thermistor 18, nominally 750 ohms. The two diodes 30 and 34 were Motorola type No. IN4003.

Due to the sharp peaks of radio frequency noise that occasionally occur on household power lines, false firing of the controlled rectifier may be produced; if these are so frequent as to interfere with the accuracy of the control, a known type of R-F interference filter may optionally be connected across the supply line terminals as at 62.

In operation, the controlled rectifier conducts only in the forward direction, i.e., when its anode is positive relative to its cathode. Also, it conducts in this direction only when its gate is supplied with a firing current of sufficient magnitude. This current value is selected by the variable resistor setting at 24, and the presence of phase-shifting capacitor 20 ensures that the current through resistor 24 leads the supply line voltage by nearly 90 electrical degrees, and thus allows the gate firing point to be reached (when the thermistor 26 is calling for heat) even when the voltage input wave is at zero (the axis-crossing value), for maximum heat delivery and fast heat-up from the too-cold condition.

Since the circuit switches essentially full power on for an appropriate number of half cycles, depending upon whether the thermistor signal falls short of, or exceeds, the threshold firing conditions of the SCR, these firing conditions must remain stable if good control is to be obtained. An SCR fires at a lower gate current level when it is hot than when it is cold; sometimes by a factor of 2 to 1 or greater as between room temperature and the rated maximum temperature of the SCR. The temperature of the SCR will always be on the increase when it is conducting in service, due to the self-heating effect of the current that passes through it. Also, rising ambient temperatures in an appliance will contribute to such increase in the SCR temperature.

The thermistor 18 compensates for these effects. It has a negative temperature coefficient and is mounted directly on the SCR casing. If the temperature of the SCR increases, the thermistor senses the increase and its own resistance decreases, so that more current is shunted away from the gate than previously. By proper selection of thermistor characteristics, the total "current to fire" passing through diode 34 can be held relatively constant. By current-to-fire is meant the total current supplied by the shunt control circuit to the combined gate and thermistor 18 circuit. As far as thermistor 26 is concerned, this is the constant amount of current which will fire the SCR, and since the thermistor 26 is sensing the soleplate temperature, it is not desired that the power come on at other than a specific and constant voltage level across this thermistor. But, as far as the SCR is concerned, the "current to fire" goes down as its temperature goes up. The compensating thermistor 18 carries the extra available current, thus holding the current through diode 34 constant, as desired. In the specific embodiment, referring to FIG. 1, the thermistor 18 is 0.029 inch thick, has a resistance at 75 degrees F. of 750 ohms, and has a temperature coefficient of 4.4% per degree C.

Resistor 36 is employed to decrease the temperature undershoot and overshoot of the appliance (the sole plate of an iron, for example). The control thermistor 26 cannot respond instantaneously to the heat input when the power is first turned on, and resistor 36 limits the overshoot by providing an additional current path through thermistor 26 when the SCR is supplying current. This causes the thermistor to self-heat, and its resistance decreases, causing the SCR to turn off somewhat in advance of the time when this would otherwise occur. It should be noted that the greatest "anticipating" effect will occur when variable resistance 24 is set at the lower end of its resistance range, since it is the combined current through the resistors 24 and 36 which determines the total self-heating. This is consistent with the fact that the greater anticipating effect is needed when the temperature setting is at the higher end of its range. The operation of the path through resistor 36 in the case of cooling, or undershoot, will be obvious, since it is merely the converse of that just described.

To a minor degree, the "overshoot" and "undershoot" compensations just described prevent excessive swings in the appliance heater temperature when there are sudden changes in the heat requirements; for example, when a pressing iron is placed in contact with a wet or damp area of material being ironed. However, the main purpose of the anticipation is to eliminate the sawtooth-shaped temperature curve which would otherwise occur when the iron is running at no load. This is the time when too much input power can raise the sole plate to a temperature which could scorch the material if the iron is suddenly put down on a cloth. Usually, there is little danger of reaching excessive temperatures during continuous ironing, because the temperature creeps up slowly and the thermistor can keep up with the sole plate temperature.

Figure 3:
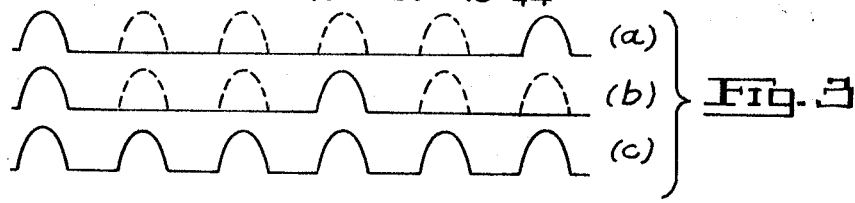
FIG. 3 is a set of graphical wave forms illustrating the special kind of control exercised by the invention in terms of discrete half-waves of heating current.

FIG. 3 of the drawings illustrates the distinction, described earlier herein, between prior art phase-angle firing controls and the discrete half-cycle on-off control of the invention. The solid line half waves represent conduction intervals, while the dotted half waves illustrate half-wave intervals which are "skipped" (non-conduction). In FIG. 3a, very little power is being called for, and the SCR fires only once for every few cycles of the A-C supply. When more power is required, as in b, the SCR fires more frequently, and for maximum loading, as when the iron is heating up from its cold condition, power is applied at every positive half cycle, as in c. Characteristics of this type are obtainable because the response time of the thermistor 26 to the anticipating current is very short (a few milliseconds) so that one or two firings of the SCR will be enough to cause it to turn itself off due to the anticipating effect of the current heating the thermistor, unless a heavy load is drawing an equal or greater amount of heat away from the thermistor 26. In the latter case, the anticipatory heating will be overcome by the cooling effect of the load, and the SCR will fire more often or continuously. In other words, the control makes a decision substantially every cycle as to whether to supply heating current or not. When it decides to supply heat, the current is supplied in integral complete half-cycles. The decision is based on the amount of load (which is cooling the thermistor) and the residual heating effect of the last burst of anticipating current, and the residual effect of the last burst of current into the heating element.

There is another possibility of excessive overshoot, and that is when the appliance (iron, for example) is first put into use from its cold or room-temperature condition. The temperature it reaches may go as much as 45 degrees F. above the set-point called for by resistor 24. Such overshoot can be eliminated by the arrangement shown in FIG. 4, which details only the modified portion to be substituted for FIG. 1 at the points marked X,X,X.

Figure 4:
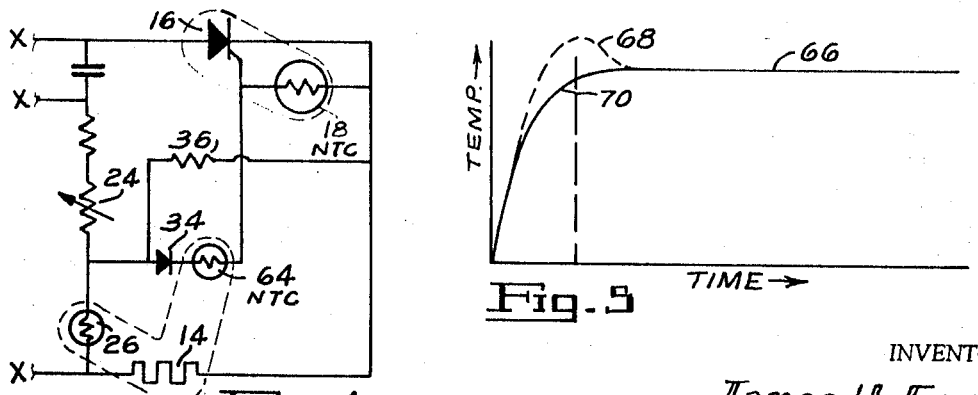
FIG. 4 is a schematic view of a portion of FIG. 1 showing a modification in the circuitry.
Figure 5:
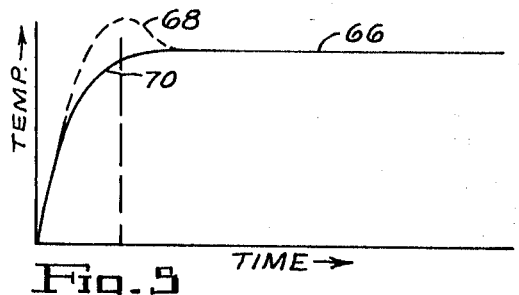
FIG. 5 is a time-temperature graph illustrating the action of the FIG. 4 circuit.

In FIG. 4, an additional thermistor 64, of about 300 ohms cold resistance, is placed in series with the diode 34 in the SCR gate circuit. The added thermistor should have a negative temperature coefficient, and is also placed in heat-transfer relation to the sole plate or heater, preferably at a location where there is a time lag of quite a few seconds behind the heating curve of the sole plate, yet where the temperature finally stabilizes at a reasonably constant value during usage of the appliance. When the iron is cold, say at room temperature, thermistor 64 has its maximum resistance, but there is still no difficulty in getting full power "on" because thermistor 26 has a resistance of about 10,000 ohms and is supplying an extremely large "on" signal. Referring now to FIG. 5, numeral 66 designates the desired stabilized temperature of the iron, and without thermistor 64 this condition would be reached via the overshoot hump indicated at 68. The impeding effect of thermistor 64 is not felt until the resistance of the sole plate thermistor drops considerably as it warms up. As the sole plate and thermistor 26 approach the set temperature, thermistor 64 is still relatively cool because of its time lag, and its impedance begins to shut the power down to avoid overshoot. The result is the smooth approach to the set temperature as indicated at 70 in FIG. 5. After the danger of overshoot passes, thermistor 64 becomes warm (roughly at the temperature inside the handle or case of the hot iron) and it then represents a low and fairly stable impedance to the flow of gate current.

Figure 6:
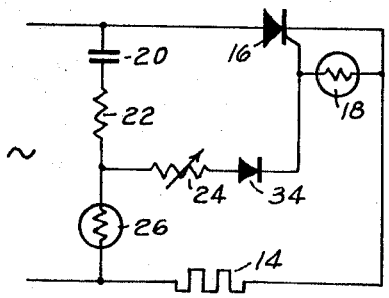
FIG. 6 is a fragmentary circuit diagram illustrating a variation in the placement of the variable control resistor of FIG. 1.
Figure 7:
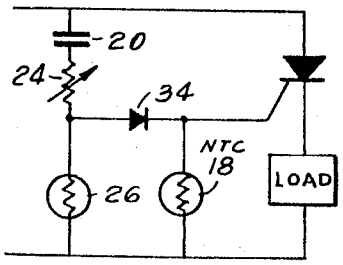
FIG. 7 is a similar fragmentary schematic showing a variation in the placement of the gate-compensating thermistor of previous examples of the circuitry.
Figure 8:
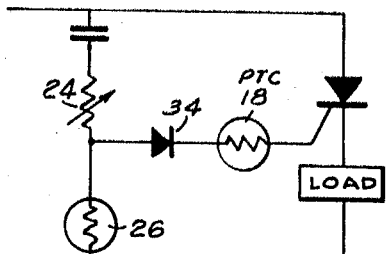
FIG. 8 is similarly a fragmentary illustration of the application of a positive temperature-coefficient thermistor in a circuit of this type.

FIGS. 6 through 10 illustrate minor variations in the circuits as described above. In FIG. 6, for example, it is indicated that the variable control resistor 24 need not be in series with capacitor 20 and thermistor 26, but may be in series with diode 34. FIG. 7 illustrates that the gate compensating thermistor 18 need not be connected to the cathode of the SCR, but may be connected between the gate electrode and a supply terminal. FIG. 8 shows that the gate compensating thermistor 18 may also be placed between diode 34 and the gate electrode, so long as it is mounted on the SCR but electrically insulated therefrom.

Figure 9:
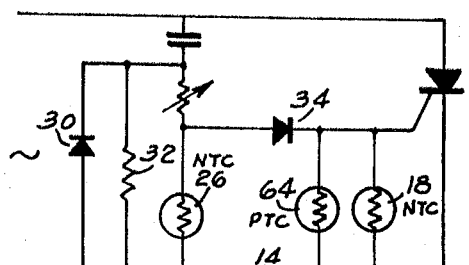
FIG. 9 is again a fragmentary schematic of a variation in the connection of the thermistors to the SCR gate.
Figure 10:
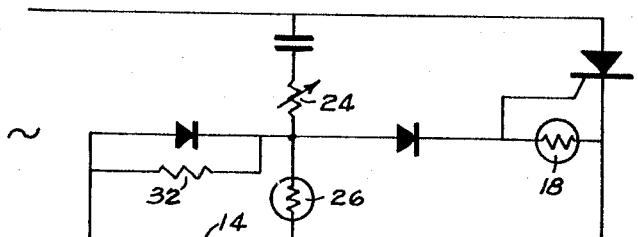
FIG. 10 is a similar variation relating to the connection of the anticipating resistance other than to the cathode of the SCR.

FIG. 9 illustrates that the ambient-temperature compensating thermistor 64 need not be in series with the gate electrode of the SCR. If it is a PTC device, it may be installed so as to shunt the gate current path. In FIG. 10, an arrangement is shown in which the anticipating resistance 32 is not connected to the cathode of the SCR; by moving the heater resistor 14, as shown, the resistor 32 may be connected between the lower supply conductor and a point between the setting resistor 24 and the sole plate thermistor 26. In these diagrams, not all of the components of the earlier FIG. 1 have been repeated, but only such as will aid in understanding the variants being described.

All of the foregoing examples of the application of the invention have been directed to appliances in which a massive solid (e.g., metallic) heat transfer and storage member is heated by the heating element. The principles involved, however, are applicable to situations in which the heat storage member is non-metallic, or even a liquid, such as the body of heat storage water, oil or the like employed in liquid-bath thermostatically controlled devices. In such a case, the heating element would be immersed in the bath liquid, or otherwise placed in good heat-transfer relation to it, the control thermistor near the heater, and the ambient-temperature compensating thermistor would be placed to sense the bath temperature, but with a time lag as described above.

Figure 11:
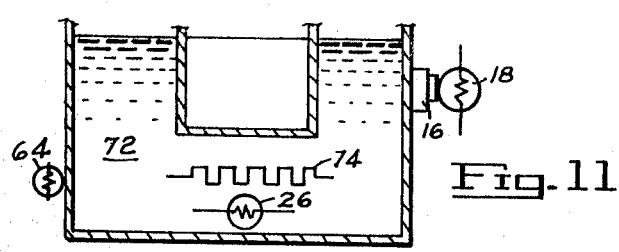
FIG. 11 is a diagrammatic showing of the application of the invention to a fluid-bath type of heating system.

FIG. 11 shows schematically such an arrangement, with the water bath liquid indicated at 72, immersing the heater 74. The control thermistor 26 is positioned close to the heater, suitably insulated if necessary, and the ambient-temperature compensating thermistor 64 is positioned so as to sense the bath temperature at a distance from the heater. Even if the SCR is positioned remote from the heater and bath, the gate-compensating thermistor in heat-transfer relation to the SCR will be useful, as it would still be desirable to compensate the SCR control action for increases in its gate junction temperature due to self-heating.

While the invention has been described herein in connection with typical appliances, and in considerable detail as to possible circuits and arrangements, it should be understood that such details are not intended as limiting, and that all variations are intended to be included insofar as they fall within the scope of the appended claims.

What is claimed is:

1. An electric heater control system for half-cycle operation from alternating current supplies, comprising, in combination, a heating resistance, a solid state controlled rectifier having anode and cathode terminals connected directly in series with said heating resistance and a source of alternating current, said controlled rectifier having a gate electrode; a control circuit characterized by a substantially constant phase shift of substantially 90 degrees, connected effectively across said source of alternating current, said control circuit including a capacitance, a variable control resistance and a thermistor, with said thermistor in heat-transfer relation to said heating resistance; and circuit means connecting an intermediate point of said control circuit to the gate electrode of said controlled rectifier, to cause the latter to conduct for controlled numbers of essentially complete half-cycles of one polarity of the alternating current source.

2. An electric heater control system in accordance with claim 1, in which said circuit means includes a diode poled to conduct current to said gate electrode only during half cycles of the supply voltage corresponding to the conductive direction of said controlled rectifier.

3. An electric heater control system in accordance with claim 1, and a second thermistor connected in series with the gate electrode.

4. An electric heater control system in accordance with claim 1, and a second thermistor connected between the gate electrode and the cathode terminal of said controlled rectifier.

5. An electric heater control system in accordance with claim 2, in which said circuit means further includes a thermistor connected in series with said diode.

6. An electric heater control system in accordance with claim 1, in which said circuit means further includes a thermistor connected to modulate the gate firing level of said rectifier in accordance with ambient temperature levels relatively remote from said heating resistance.

7. An electric heater control system in accordance with claim 3, in which said second thermistor is mounted in heat-transfer relation to said controlled rectifier.

8. An electric heater control system in accordance with claim 4, in which said circuit means further includes a thermistor connected to modulate the gate firing level of said rectifier in accordance with ambient temperature levels relatively remote from said heating resistance.

9. An electric heater control system in accordance with claim 1, in which there is included an anticipating resistance connected between a point on the circuit connecting the controlled rectifier and the heating resistance to the supply terminals, and the point of connection of said circuit means to said control circuit.

10. An electric heater control system in accordance with claim 1, including a by-pass resistance connected between the cathode terminal of said controlled rectifier and the point of connection of said circuit means to said control circuit.

References Cited

UNITED STATES PATENTS

| | | |
|---|---|---|
| 3,109,910 | 11/1963 | Fogleman. |
| 3,114,819 | 12/1963 | Woodling _____ 219—505 X |
| 3,113,198 | 12/1963 | Shinn _____ 219—404 |
| 3,149,224 | 9/1964 | Horne et al. |
| 3,218,511 | 11/1965 | Rosenbaum. |
| 3,244,965 | 4/1966 | Gutzwiller. |
| 3,275,802 | 9/1966 | Vandivere et al. |
| 3,300,622 | 1/1967 | Swain. |
| 3,331,013 | 7/1967 | Cunningham. |
| 3,371,231 | 2/1968 | Burley _____ 219—510 X |

BERNARD A. GILHEANY, Primary Examiner

F. E. BELL, Assistant Examiner

U.S. Cl. X.R.

219—505